Patented Oct. 9, 1934

1,975,843

UNITED STATES PATENT OFFICE 1,975,843

PURIFICATION AND HYDROGENATION OF PYRIDINES

Ivan Gubelmann and Clyde O. Henke, South Milwaukee, Wis., assignors, by mesne assignments, to E. I. du Pont de Nemours & Company, a corporation of Delaware No Drawing. Application July 3, 1931, Serial No. 548,710

19 Claims. (Cl. 260—42)

This invention relates to a process of hydrogenating pyridine or its homologs.

More specifically, this invention relates to a process of purifying pyridine or its homologs and hydrogenating the purified product directly into piperidine or its homologs by the aid of common hydrogenation catalysts.

Heretofore, the catalytic hydrogenation of pyridine into piperidine by means of gaseous hydrogen has always constituted a difficult problem in the art. The earliest attempts in this direction, using nickel as catalyst, brought about a disruption of the ring, yielding amyl-amine, instead of piperidine. (See, for example, Sabatier-Reid, "Catalysis in Organic Chemistry"; N. Y., 1923; page 174; citing Sabatier and Mailhe, Compt. rend., vol. 144, page 784). Subsequent attempts, using noble metals as catalysts, were only partially successful, since, in the first place, specially prepared noble metal catalysts were required (Skita and Meyer, Berichte vol. 45, pages 3589–3592), and secondly, these became quickly poisoned and inactive, thus rendering the process inapplicable on a large scale. (Green, "Industrial Catalysis", N. Y., 1928, pages 197–198; Zelinsky and Borisoff, Berichte, vol. 57 B, pages 150–2).

More recently specially prepared nickel catalysts have been developed or proposed, by the aid of which pyridine is said to be hydrogenized into piperidine more or less successfully. (U. S. Patent No. 1,695,666; British Patents Nos. 309,300 and 203,218). All these processes involve, as stated, the preparation of the nickel catalyst in a special physical form, which special preparation, of course, adds expense to the process.

We have now found that pyridine or its homologs can be made readily susceptible to catalytic hydrogenation involving the use of ordinary nickel hydrogenation catalysts, if it is subjected to a special purification process as more fully described below. This purification process evidently removes from the pyridine or pyridine homologs certain substances which tend to poison the catalyst, although they may be present in the initial product in insignificantly small quantities. It is remarkable, for instance, that what is known as "Pyridine, C. P." will not lend itself to successful hydrogenation by the aid of reduced nickel, except when subjected to our novel purification process herein set forth.

It is therefore an object of this invention to provide a commercially operable process whereby pyridine or its homologs may be directly hydrogenated into piperidine or its homologs by the aid of inexpensive, common, hydrogenation catalysts.

It is a further object of this invention to provide a process of purifying pyridine or its homologs so that the purified product may be readily and economically hydrogenated into piperidine or its homologs.

Other and further important objects of this invention will become apparent from the following description and appended claims.

Our novel process consists essentially in converting pyridine into a salt and separating the pyridine salt from its impurities which do not form salts, in any suitable manner, such as for example by filtration, extraction with a solvent, or evaporation. It appears that the impurities present in pyridine which act as catalyzer-poisons are not convertible into salts. Although these impurities exhibit great affinity for pyridine in the basic form, they are readily separable from the pyridine salt due to its changed nature.

In our preferred process we convert pyridine into any water-soluble salt thereof which is not readily volatile, such as, for example, the acid sulfate or the acid phosphate, and then partially evaporate an aqueous solution of the said salt. The partial evaporation of the aqueous solution carries the pyridine impurities which act as catalyzer poisons along with the water vapor, leaving the pyridine salt behind in solution, substantially free of poisons. The pyridine may then be recovered from the residual solution by any suitable and well-known manner, such as, for example, by salting it out in the form of an oily layer, separating the oily layer from the aqueous layer and drying with dry caustic. If desired, the pyridine may be distilled to improve its color.

The resulting purified product may now be subjected to hydrogenation in liquid phase in the same manner as when hydrogenating other organic substances in liquid phase, such as naphthalene for instance. More specifically, the pyridine is heated with hydrogen in a closed vessel in the presence of an ordinary hydrogenation catalyst, such as reduced nickel for example, and maintained under high temperature and pressure until hydrogen is no longer being absorbed, which point is marked by the fact that the pressure ceases to drop.

Our method is applicable to pyridine as well as to its homologes, such as, for example, picoline (methyl-pyridine).

The following examples will serve further to illustrate our invention, but it will be understood that our method is not limited to the precise details set forth. Parts given are by weight.

Example 1

240 parts of pyridine, C. P., are introduced slowly into a mixture of 330 parts of 66° Bé. sulfuric acid and 430 parts of water. The mixture is now heated to boiling until about 200 parts of water have distilled off. The mass is now cooled and a solution of 264 parts of caustic soda in 396 parts of water is added. Upon settling, the mixture separates into two layers, the upper layer of which consists of pyridine with some water dissolved therein. This upper layer is drawn off and shaken with 70 parts of powdered caustic soda. Generally it will be observed that the caustic soda has absorbed sufficient water to dissolve therein, which solution eventually separates out as a distinct layer. The supernatant pyridine layer is then again drawn off and shaken further with 10 parts of dry caustic soda. The mixture is again allowed to settle, and the pyridine layer is again drawn off and optionally again shaken with 10 parts of dry caustic soda, until the added caustic soda no longer completely dissolves. The oily layer finally drawn off consists of substantially pure and dry pyridine, except for the presence of certain coloring matters which may have been absorbed from the reagents. It can be finally purified of these by a single distillation.

The amount of pure pyridine thus obtained is about 220 parts. If treated with hydrogen under a pressure of about 400 to 500 lbs. per square inch, and at a temperature of about 225° C. in the presence of about 3% of its own weight of a reduced mixed nickel catalyst, it absorbs hydrogen readily, yielding piperidine in substantially theoretical quantities.

It is remarkable that if the same grade of pyridine (C. P.) be subjected to the same hydrogenating treatment without previously undergoing our novel re-purification method, it reacts with the hydrogen much more slowly, and ultimately absorbs only ⅓ to ½ the quantity of hydrogen required for complete hydrogenation. Evidently the product in this case is not piperidine but a mixture of various intermediate hydrogenation products with, perhaps, some unchanged pyridine.

Example 2

A mixture of 300 parts of technical grade pyridine (boiling range=100 to 160° C.) and 100 parts of water is introduced slowly into a solution of 360 parts of 66° Bé. sulfuric acid in 360 parts of water. An oily layer separates, in an amount of 3.6 parts, and is removed. The mixture is heated to boiling until about 200 parts of water carrying small amounts of some water insoluble substance have evaporated. 200 parts of water are now added to the mixture, and distillation is continued until about 200 parts of water have again been removed. The residual solution is now cooled, and mixed with a solution of 290 parts of caustic soda in 440 parts of water. Upon settling, two layers are formed, the upper of which, containing the pyridine bases and some water, is removed and shaken with 90 parts of solid caustic soda. The latter dissolves in the water extracted from the pyridine and settles out into a separate layer. The pyridine layer is now again drawn off and further treated with small amounts of dry caustic soda in the same manner as in Example 1, until the caustic no longer completely dissolves. The finally obtained layer of pyridine bases is then distilled as in Example 1. It yields about 250 parts of pyridine bases substantially free of catalyzer poisons, and hydrogenates readily under the conditions described in Example 1, to produce piperidine, and its homologs.

It is remarkable to note that if the same grade of technical pyridine is subjected to hydrogenation under the same conditions as in Example 1, but without previous purification according to our novel process herein described, it will not absorb even as much as 10% of the quantity of hydrogen theoretically requisite to produce piperidine.

Example 3

A mixture of 1400 parts of pyridine (C. P.) and 1000 parts of water are introduced slowly into a solution of 760 parts of 66° Bé. sulfuric acid in 1000 parts of water. The mixture is now alternately shaken with ether and separated therefrom by settling and decantation, the procedure being repeated 4 or 5 times. 625 parts of dry caustic soda, are now added to the aqueous mass to liberate the free pyridine base, which separates as an oily layer. Upon drying with dry caustic soda as in Examples 1 or 2, the product may be hydrogenated into piperidine with satisfactory yield.

Instead of ether, other organic liquids, such as, for example, benzol, may be used as extracting agents to remove the non-salt forming impurities.

It is to be understood that our process is not limited to the precise details set forth, but is susceptible to many variations and modifications, as will be readily understood to those skilled in the art.

In the claims below it should be understood that by the term "a pyridine compound" we mean to cover and include pyridine and its homologs.

We claim as our invention:

1. A process of hydrogenating a pyridine compound, which comprises converting said compound into a water soluble salt thereof, separating an aqueous solution of said salt from catalyzer poisons, reconverting the resulting purified salt into the basic form and subjecting the resulting purified pyridine compound in the liquid phase to the action of hydrogen at elevated temperature and pressure in the presence of a hydrogenation catalyst.

2. A process for producing piperidine, which comprises converting pyridine into a water soluble salt thereof, separating an aqueous solution of said salt from any residual foreign substances, reconverting the purified pyridine-salt into basic pyridine and hydrogenating the purified basic pyridine in liquid phase in the presence of reduced nickel.

3. A process for producing methyl-piperidine, which comprises converting methyl-pyridine into a water soluble salt thereof, separating an aqueous solution of said salt from any residual foreign substances, reconverting the purified methyl-pyridine-salt into basic methyl-pyridine, and hydrogenating the purified basic methyl pyridine in liquid phase in the presence of reduced nickel.

4. In the process of treating a pyridine compound to adapt the same for hydrogenation into a piperidine compound, the step which comprises partially evaporating an aqueous mass containing the pyridine compound in the form of a nonvolatile salt thereof to remove volatile impurities therefrom, and recovering the pyridine body from the residual aqueous mass.

5. In the process of purifying pyridine to adapt the same for hydrogenation into piperidine, the step which comprises converting said pyridine compound into a non-volatile water soluble salt thereof, partially evaporating an aqueous solution of the said salt to remove volatile impurities therefrom, and recovering pyridine from the residual aqueous solution.

6. The process of purifying a pyridine compound which comprises partially evaporating an aqueous solution of a non-volatile water-soluble salt thereof to remove volatile impurities therefrom, reconverting the salt into the free base, separating the free base from the solution and drying said free base.

7. The process of purifying a pyridine compound which comprises converting said compound into a non-volatile water soluble salt, partially evaporating an aqueous solution of the salt to remove water and substances volatile with steam therefrom, adding a caustic alkali to the residual solution to reconvert the salt into the free base, settling out and removing said base, and removing the water dissolved in said base.

8. The process of purifying a pyridine compound, which comprises dissolving said compound in an aqueous sulfuric acid solution, boiling said solution to remove part of the water and substances volatile with steam therefrom, adding an alkali to the residual solution to liberate the free base of said pyridine compound, allowing the mixture to settle into layers, separating the basic layer, treating said basic layer with dry caustic alkali until substantially free of dissolved water, and finally distilling the dried base.

9. The process of purifying a commercial grade of pyridine to adapt the same for catalytic hydrogenation by the aid of a nickel catalyst, which comprises dissolving said commercial grade of pyridine in an aqueous sulfuric acid solution, boiling said solution until part of the water has evaporated, treating the residual solution with caustic alkali to liberate and separate the free pyridine base, drawing off the separated base, treating the base with solid caustic alkali to remove water dissolved therein and distilling the dehydrated base.

10. The process of purifying a pyridine compound to adapt the same for hydrogenation into a piperidine compound, which comprises converting said pyridine compound into a water soluble salt, extracting an aqueous solution of the salt with an inert organic liquid extracting agent of the group consisting of ether and benzenoid solvents to remove impurities soluble in the agent therefrom, and reconverting the purified salt into the basic form.

11. A process of hydrogenating pyridine which comprises converting said pyridine into a water-soluble salt, extracting an aqueous solution of the salt with an inert organic liquid extracting agent of the group consisting of ether and hydrocarbons of the benzene series, to remove from said solution impurities which are soluble in said extracting agent, reconverting the purified salt into basic pyridine, and hydrogenating the purified basic pyridine in the presence of reduced nickel.

12. The process of purifying a pyridine compound to adapt the same for hydrogenation into a piperidine compound, which comprises converting said pyridine into a water soluble salt, extracting an aqueous solution of the salt with ether to remove impurities soluble in the ether therefrom, and re-converting the purified salt into the basic form.

13. A process of hydrogenating pyridine, which comprises converting said pyridine into a water soluble salt, extracting an aqueous solution of the salt with ether to remove impurities soluble with the ether therefrom, re-converting the purified salt into basic pyridine and hydrogenating the purified basic pyridine in the presence of reduced nickel.

14. A process of hydrogenating a pyridine compound, which comprises converting said compound into a water soluble salt thereof, evaporating partially an aqueous solution of said salt to separate therefrom volatile catalyzer poisons, reconverting the resulting purified salt into the basic form and subjecting the resulting purified pyridine compound in the liquid phase to the action of hydrogen at elevated temperature and pressure in the presence of a hydrogenation catalyst.

15. A process for producing piperidine, which comprises converting pyridine into a water soluble salt thereof, evaporating partially an aqueous solution of said salt to separate therefrom volatile foreign substances, reconverting the purified pyridine-salt into basic pyridine and hydrogenating the purified basic pyridine in liquid phase in the presence of reduced nickel.

16. A process for producing methyl-piperidine, which comprises converting methyl-pyridine into a water soluble salt thereof, evaporating partially an aqueous solution of said salt to separate therefrom volatile foreign substances, reconverting the purified methyl-pyridine-salt into basic methyl-pyridine, and hydrogenating the purified basic methyl pyridine in liquid phase in the presence of reduced nickel.

17. A process of hydrogenating a pyridine compound, which comprises converting said compound into its acid sulfate, separating an aqueous solution of said sulfate from catalyzer poisons, reconverting the resulting purified sulfate into the basic form and subjecting the resulting purified pyridine compound in the liquid phase to the action of hydrogen at elevated temperature and pressure in the presence of a hydrogenation catalyst.

18. A process for producing piperidine, which comprises converting pyridine into its acid sulfate, separating an aqueous solution of said sulfate from residual foreign substances, reconverting the purified pyridine-salt into basic pyridine and hydrogenating the purified basic pyridine in liquid phase in the presence of reduced nickel.

19. A process for producing methyl-piperidine, which comprises converting methyl-pyridine into its acid sulfate, separating an aqueous solution of said sulfate from residual foreign substances, reconverting the purified methyl-pyridine-salt into basic methyl-pyridine, and hydrogenating the purified basic methyl pyridine in liquid phase in the presence of reduced nickel.

IVAN GUBELMANN.
CLYDE O. HENKE.